United States Patent [19]

Linville, Jr. et al.

[11] Patent Number: 4,853,903

[45] Date of Patent: Aug. 1, 1989

[54] METHOD AND APPARATUS FOR REMOVING SINUSOIDAL NOISE FROM SEISMIC DATA

[75] Inventors: Andrew F. Linville, Jr., Dallas; Thomas E. Shirley, Richardson; Paul G. Griffith, Farmers Branch, all of Tex.

[73] Assignee: Mobil Oil Corporation, New York, N.Y.

[21] Appl. No.: 259,941

[22] Filed: Oct. 19, 1988

[51] Int. Cl.⁴ .......................... G01V 1/28; G01V 1/36
[52] U.S. Cl. ........................................ 367/46; 367/39; 364/421; 364/819
[58] Field of Search ........................ 367/39, 40, 46, 47; 364/421, 574, 819, 825

[56] References Cited

U.S. PATENT DOCUMENTS

| 4,104,611 | 8/1978 | Kalden | 367/46 |
| 4,561,074 | 12/1985 | Warmack | 364/421 |
| 4,780,859 | 10/1988 | Hadidi et al. | 367/43 |

OTHER PUBLICATIONS

Ohmuro et al., "An Adaptive Digital Filter as a Sinusoidal Noise Canceller", Trans. Inst. Electron. & Commun. Eng. Jpn., Sect. B, vol. B 64, #9, p. 619, 9/81.
Gastev et al., "The Stability of an Autocompensator for Sinusoidal Interference", 4/86, Radiotekhnika Moshua, vol. 41, #4, pp. 37–39.

Primary Examiner—Nelson Moskowitz
Attorney, Agent, or Firm—Alexander J. McKillop; Charles J. Speciale; George W. Hager, Jr.

[57] ABSTRACT

Method and apparatus for removing sinusoidal noise from seismic traces comprised of a seismic data component and a sinusoidal noise component. Seismic traces acquired by conventional seismic exploration of a subsurface formation are utilized to produce a frequency domain amplitude spectrum of the traces. The amplitude spectrum is analyzed to determine a line frequency equivalent to the sinusoidal noise frequency to be removed. A filter order N (number of filter weights) is selected and the exact autocorrelation function of the selected sinusoidal frequency is determined for lags 0, 1, ..., N−1. An autocorrelation matrix is produced utilizing the determined autocorrelation values and predictive deconvolution techniques are applied to the autocorrelation matrix to produce a convolutional filter which will remove sinusoidal noise at the determined frequency while leaving other frequencies minimally attenuated. The sinusoidal noise is then removed from the seismic data by convolving the acquired seismic traces with the filter.

22 Claims, 8 Drawing Sheets

FIG. 4a

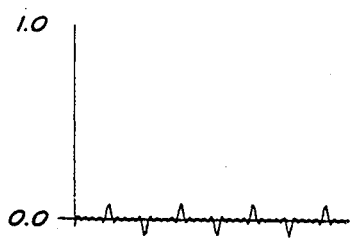

```
NUMBER OF POINTS        =     128
SAMPLE INTERVAL (SEC)   =       0.0005
OPERATOR LENGTH (SEC)   =       0.064
LINE FREQUENCY (HZ)     =      60.000
LINE FREQUENCY (HZ)     =     180.000
LINE FREQUENCY (HZ)     =     300.000
LINE FREQUENCY (HZ)     =     420.000
LINE FREQUENCY (HZ)     =     540.000
DFACTOR                 =       1.000
SFACTOR                 =       5
NYQUIST FREQUENCY       =    1000.000
POWER OF TWO FOR FFT    =    2048
```

FIG. 4b

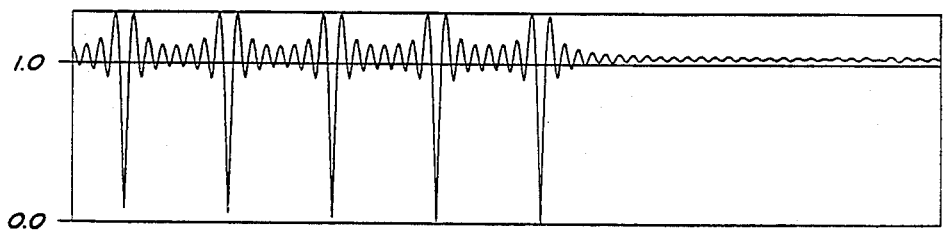

FIG. 4c

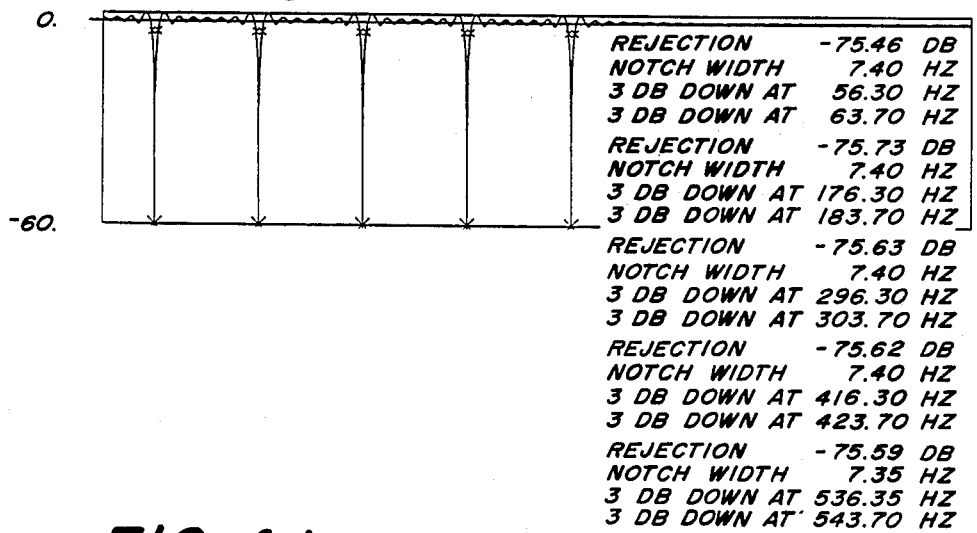

```
REJECTION          -75.46 DB
NOTCH WIDTH          7.40 HZ
3 DB DOWN AT        56.30 HZ
3 DB DOWN AT        63.70 HZ

REJECTION          -75.73 DB
NOTCH WIDTH          7.40 HZ
3 DB DOWN AT       176.30 HZ
3 DB DOWN AT       183.70 HZ

REJECTION          -75.63 DB
NOTCH WIDTH          7.40 HZ
3 DB DOWN AT       296.30 HZ
3 DB DOWN AT       303.70 HZ

REJECTION          -75.62 DB
NOTCH WIDTH          7.40 HZ
3 DB DOWN AT       416.30 HZ
3 DB DOWN AT       423.70 HZ

REJECTION          -75.59 DB
NOTCH WIDTH          7.35 HZ
3 DB DOWN AT       536.35 HZ
3 DB DOWN AT       543.70 HZ
```

FIG. 4d

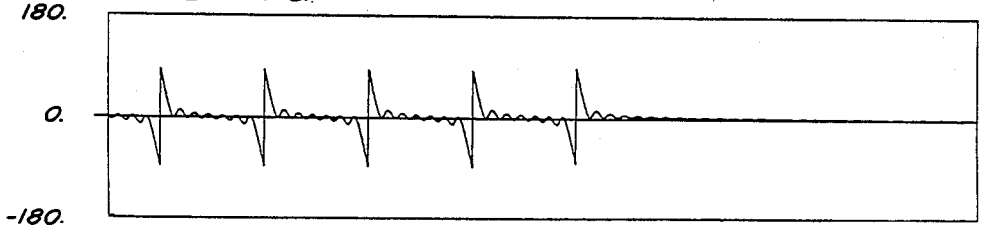

NUMBER OF POINTS = 63
SAMPLE INTERVAL (SEC) = 0.002
OPERATOR LENGTH (SEC) = 0.124
LINE FREQUENCY (HZ) = 60.000
DFACTOR = 1.000
SFACTOR = 5
NYQUIST FREQUENCY = 250.000
POWER OF TWO FOR FFT = 2048

REJECTION = -69.74 DB
NOTCH WIDTH = 3.80 HZ
3 DB DOWN AT = 58.10 HZ
3 DB DOWN AT = 61.90 HZ

METHOD AND APPARATUS FOR REMOVING SINUSOIDAL NOISE FROM SEISMIC DATA

BACKGROUND OF THE INVENTION

This invention relates to seismic exploration and more particularly to a method and apparatus for removing sinusoidal noise from seismic data. This invention further relates to method and apparatus for providing an improved notch filter which utilizes an exact mathematical description of sinusoidal noise for application to a noisy seismic trace.

In seismic exploration, it is common practice to deploy a large array of geophones on the surface of the earth and to record the vibrations of the earth at each geophone location to obtain a collection of seismic traces. The traces are sampled and recorded for further processing. When the vibrations so recorded are caused by a seismic source activated at a known time and location, the recorded data can be processed by a computer in known ways to produce an image of the subsurface. The image thus produced is commonly interpreted by geophysicists to detect the possible presence of valuable hydrocarbons.

Seismograms are commonly recorded as digital samples representing the amplitude of a received signal as a function of time. Since seismograms are usually obtained along a line of exploration on the surface of the earth, the digital samples can be formed into x-t arrays with each sample in the array representing the amplitude of the seismic signal as a function of horizontal distance and time. When such arrays are visually reproduced, by plotting or the like, seismic sections are produced. A seismic section depicts the subsurface layering of a section of the earth. Before an array of seismic samples or traces can be converted into a seismic section for interpretations by geophysicists, the array must be extensively processed to remove noise and to make reflection events discernible.

In the course of seismic exploration, a significant amount of noise is introduced into the seismic data by the influence of man. Such introduced noise, generally referred to as "cultural noise", may include noise from power lines, electrical machinery or other sources. As a result, sinusoidal noise is often a serious problem in analyzing seismic records. However, geophysicists usually ignore the sinusoidal noise or rely upon deconvolving and/or stacking of the seismic data to reduce sinusoidal noise. Unfortunately, sinusoidal noise left on a seismic record degrades subsequent processing techniques such as determining amplitude recovery parameters, source-receiver coupling corrections, source-receiver static corrections, trace editing, deconvolution, multiple removal, and wavelet estimates. However, using deconvolution to simultaneously remove sinusoidal noise and whiten the data leads to relatively poor signal to noise ratios and to signal distortion.

Another method for removing such types of sinusoidal noise contamination is to pass the seismic data through a notch filter. Unfortunately, poor results were often obtained when the removal of contaminating sinusoidal noise was attempted utilizing notch filters. First, the notch may not be centered exactly at the frequency of the contaminating noise, thereby making it more likely that not all of the contaminating noise will be removed by the notch. Second, the notch may remove a considerable amount of valid data along with the noise if the valid data has a frequency within the notch and the notch is wide. Finally, in some cases, the notch filter will induce phase distortion in the data.

Much of the seismic data collected today is contaminated by power-line interference or sinusoidal interference from nearby power generators. Noise from high-voltage transmission lines is considered very stationary and therefore can be effectively removed by notch filtering, provided that a filter with a narrow and deep notch can be utilized. In the past, to construct a notch filter having both a deep and narrow notch required the use of very long filter operators. However, such a practice has been discouraged as the amount of computer time required to apply the long filter operators having a deep and narrow notch is very high, thus adding substantially to the cost of notch filtering the seismic data.

SUMMARY OF THE INVENTION

It is an object of this invention to provide an improved low cost notch filter for higher resolution sinusoidal noise rejection.

It is another object of this invention to provide an improved notch filter which requires only one-fourth as many digital filter points as prior notch filters for construction.

It is still another object of this invention to provide a notch filter which is constructed using an exact mathematical description of the contaminating noise to be removed.

It is still yet another object of this invention to provide a least square, optimal filter for removing sinusoidal noise at specified frequencies while minimizing distortion at other frequencies.

It is a feature of this invention to provide a minimum phase Wiener-Levinson predictive deconvolution filter designed to precisely remove sinusoidal noise of specified frequencies utilizing an autocorrelation matrix constructed using an exact mathematical description of the sinusoidal noise to be removed.

It is another feature of this invention to provide a method for processing seismic data without deconvolving at an early stage by applying an improved notch filter early in the processing sequence to remove sinusoidal noise.

Seismic data comprised of a plurality of seismic traces is transformed from the time domain into the frequency domain by applying the Fast Fourier Transform to the traces, thereby producing a frequency domain amplitude spectrum of the data. The amplitude spectrum is analyzed to determine a line frequency equivalent to the sinusoidal frequency to be eliminated. A filter order N (number of filter weights) is selected and the exact autocorrelation function of the selected sinusoidal frequency is determined for lags $0, 1, \ldots, N-1$. An autocorrelation matrix is produced utilizing the determined autocorrelation values and predictive deconvolution techniques are applied to the autocorrelation matrix to produce a convolutional filter which will remove sinusoidal noise at the determined frequency while leaving other frequencies minimally attenuated. The autocorrelation matrix may be modified using a white noise parameter prior to producing the convolutional filter. The sinusoidal noise is then removed from the seismic data by convolving the acquired seismic traces with the filter.

The above and other objects, advantages and features of the invention will be more readily understood from the following detailed description of the invention,

BRIEF DESCRIPTION OF THE DRAWINGS

FIG. 4a illustrates a 128 point filter operator constructed to remove sinusoidal noise from the seismic record illustrated in FIG. 2;

FIG. 4b illustrates a linear scale amplitude spectrum of the filter illustrated in FIG. 4a;

FIG. 4c illustrates a dB scale amplitude spectrum of the filter illustrated in FIG. 4a;

FIG. 4d illustrates a phase spectrum of the filter illustrated in FIG. 4a;

DESCRIPTION OF THE PREFERRED EMBODIMENT

Figure 1:
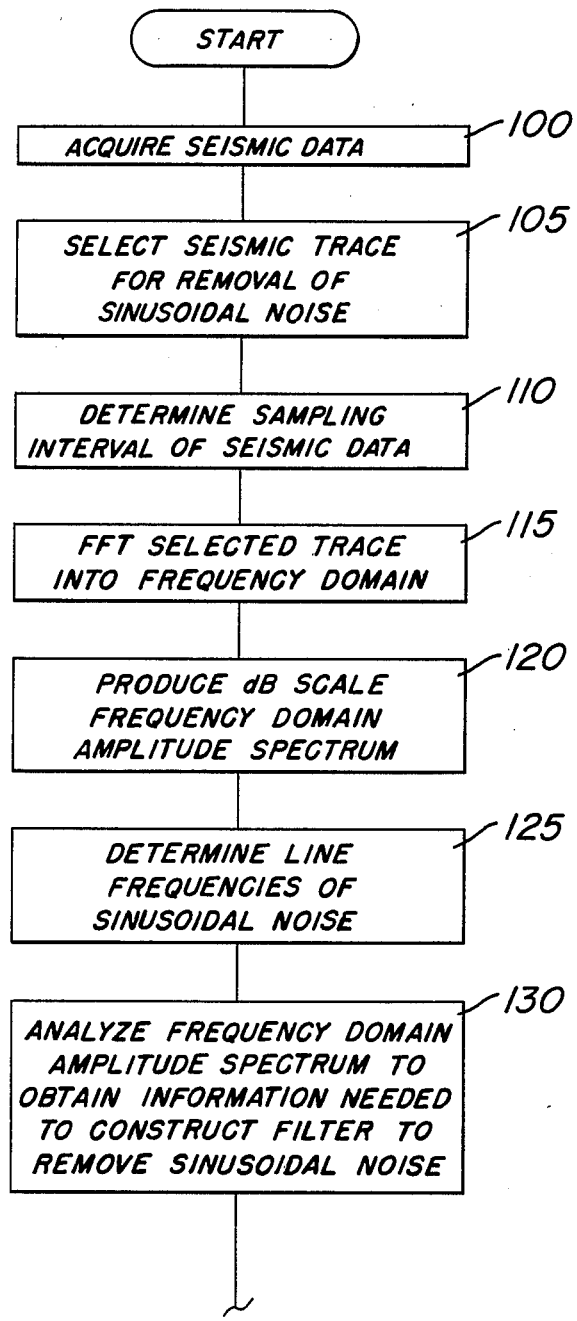
FIG. 1 illustrates, in flow-chart form, the method of removing sinusoidal noise from seismic data of the present invention.
Figure 1:
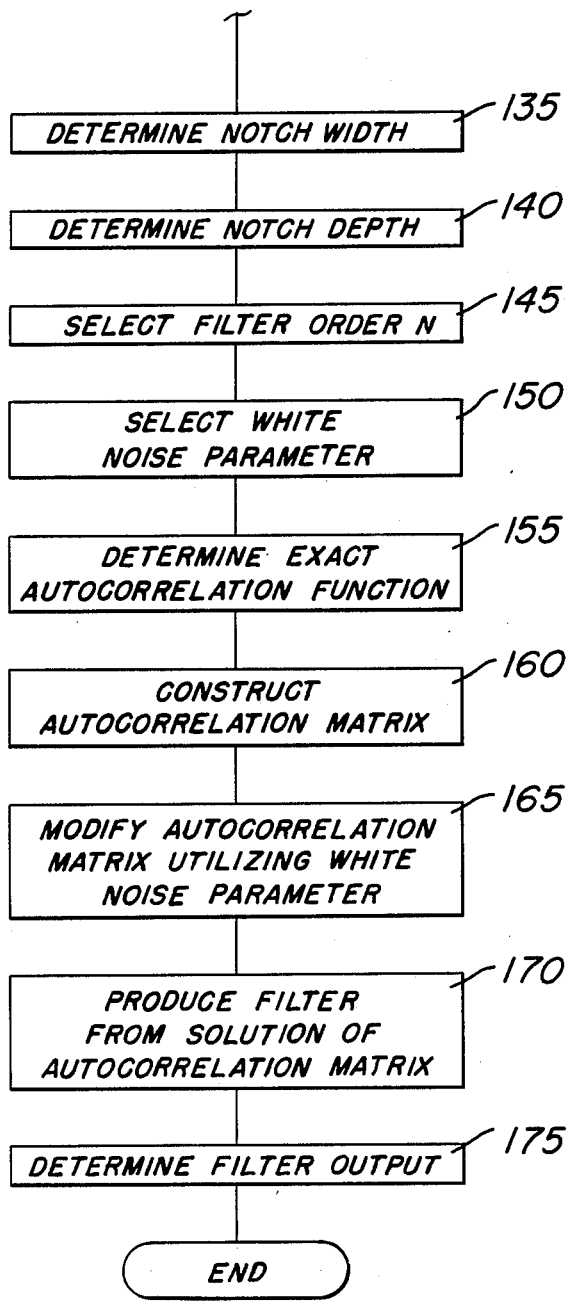
Figure 2:
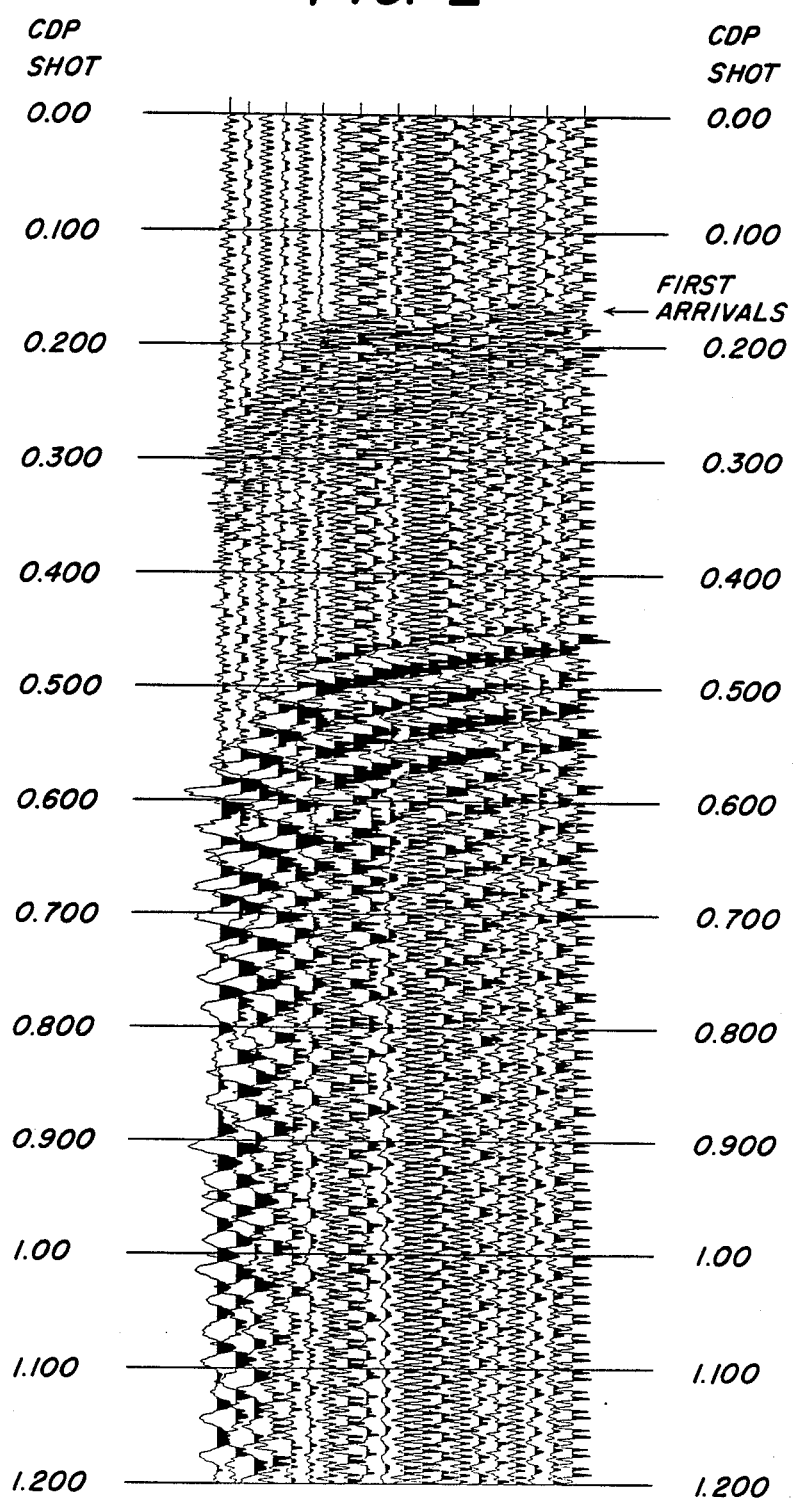
FIG. 2 illustrates an actual x-t domain seismic record acquired during seismic exploration.

Turning first to FIG. 1, the method of removing sinusoidal noise from seismic data is hereby described. The method of the present invention commences at step 100 with the acquisition of seismic data using well-known seismic exploration techniques. For example, an artificial disturbance may be generated in the earth by the use of dynamite or the like. The resulting elastic waves travel downwardly in the earth and are reflected upward from subsurface reflecting interfaces. The reflected waves are received by geophones or other detectors usually located along the surface and recorded in reproducible form as seismograms. Seismic traces which would be acquired by one such seismic survey may be seen by reference to FIG. 2. The seismic traces depicted in FIG. 2 represent reflections as a function of time t and source-receiver distance x along a line of exploration. These traces have been gathered into an x-t array commonly referred to as a "seismic section" or "seismic record".

Each recorded seismic trace $x_t$ to be filtered in accordance with the teachings set forth herein may be viewed as being comprised of two components $s_t$ and $d_t$ such that:

$$x_t = d_t + s_t \tag{1}$$

where:

$s_t$ = the sample at time t of an interfering sinusoidal interference of a specific frequency which is easily determined; and $d_t$ = the sample at time t of a white (broadband) random signal to be separated from the interfering sinusoidal noise.

To obtain the desired signal $d_t$, a filter $h_t$ must be applied to $x_t$ such that the filter output $y_t$ is approximately equal to $d_t$.

Proceeding to step 105, one of the seismic traces included as part of the produced seismic section is selected for further processing to remove sinusoidal noise from the trace. At step 110, the sampling interval of the seismic data is determined. The sampling interval may be determined according to the following:

$$\text{Sampling Interval} = \tfrac{1}{2}W \tag{2}$$

where W is the highest frequency for which the seismic trace receives useful data. For the selected seismic trace, the highest frequency at which useful data is received, also known as the Nyquist frequency, is determined to be 1000 Hz. The sampling interval would be, therefore, 0.0005 seconds.

Proceeding to step 115, the selected seismic trace is Fast Fourier Transformed into the frequency domain. For a seismic trace $x_t$, the Fourier transform is defined as:

$$X_f = \Sigma x_t e^{-j2\pi ft} dt \tag{3}$$

$$X_f = {}^t|X_f|e^{j\theta_f} \tag{4}$$

where:

$R_f$ is the real part of the Fourier transform;

$I_f$ is the imaginary part of the Fourier transform;

$|X_f|$ is the amplitude or Fourier spectrum of $x_t$ and is given by $[R^2f + I^2f]^{\frac{1}{2}}$; and $\theta_f$ is the phase angle of the Fourier transform and is given by $\tan^{-1}[I_f/R_f]$.

Figure 3:
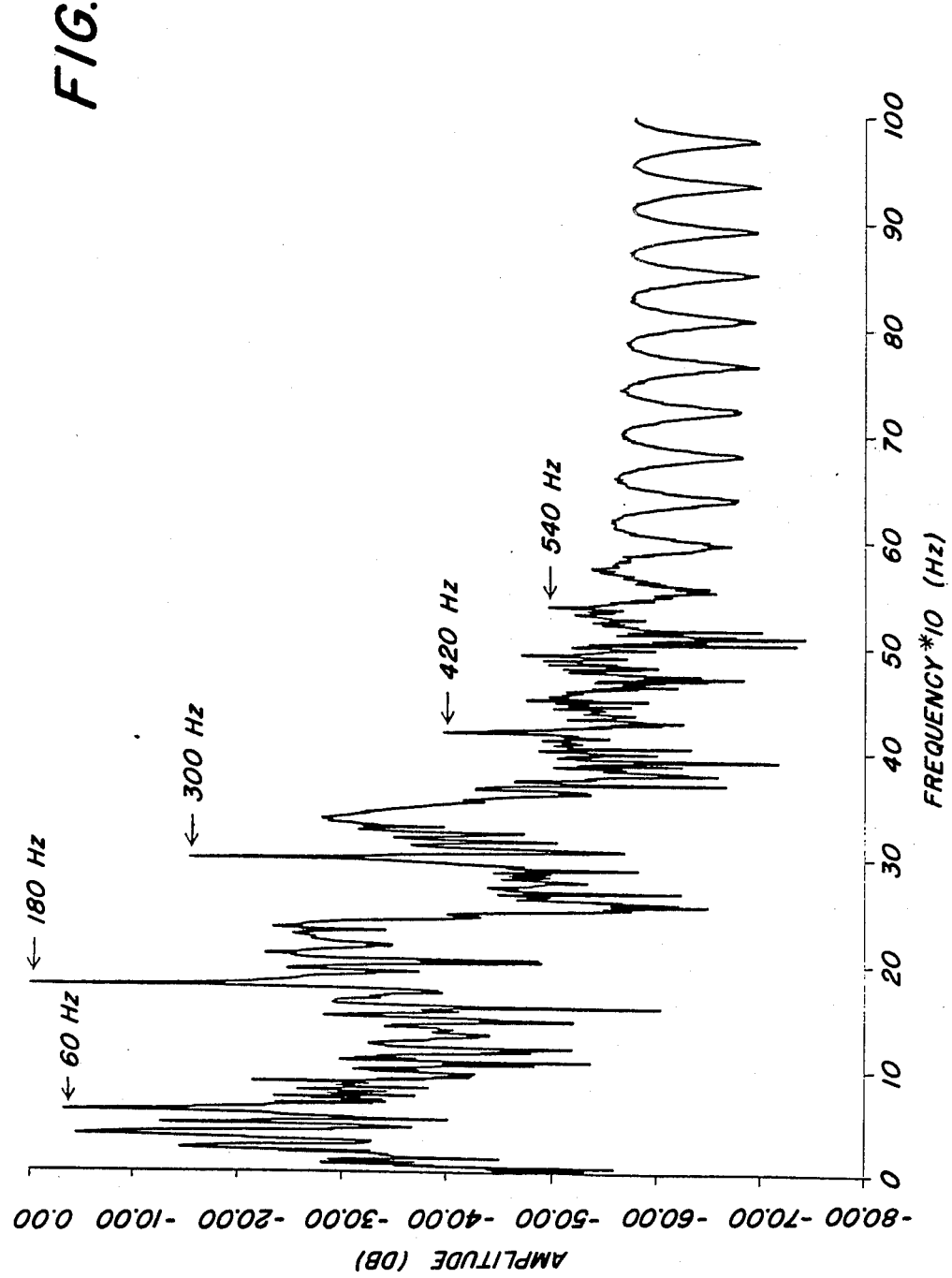
FIG. 3 illustrates a dB scale amplitude spectrum of a seismic trace selected from the seismic record illustrated in FIG. 2.
Figure 5:
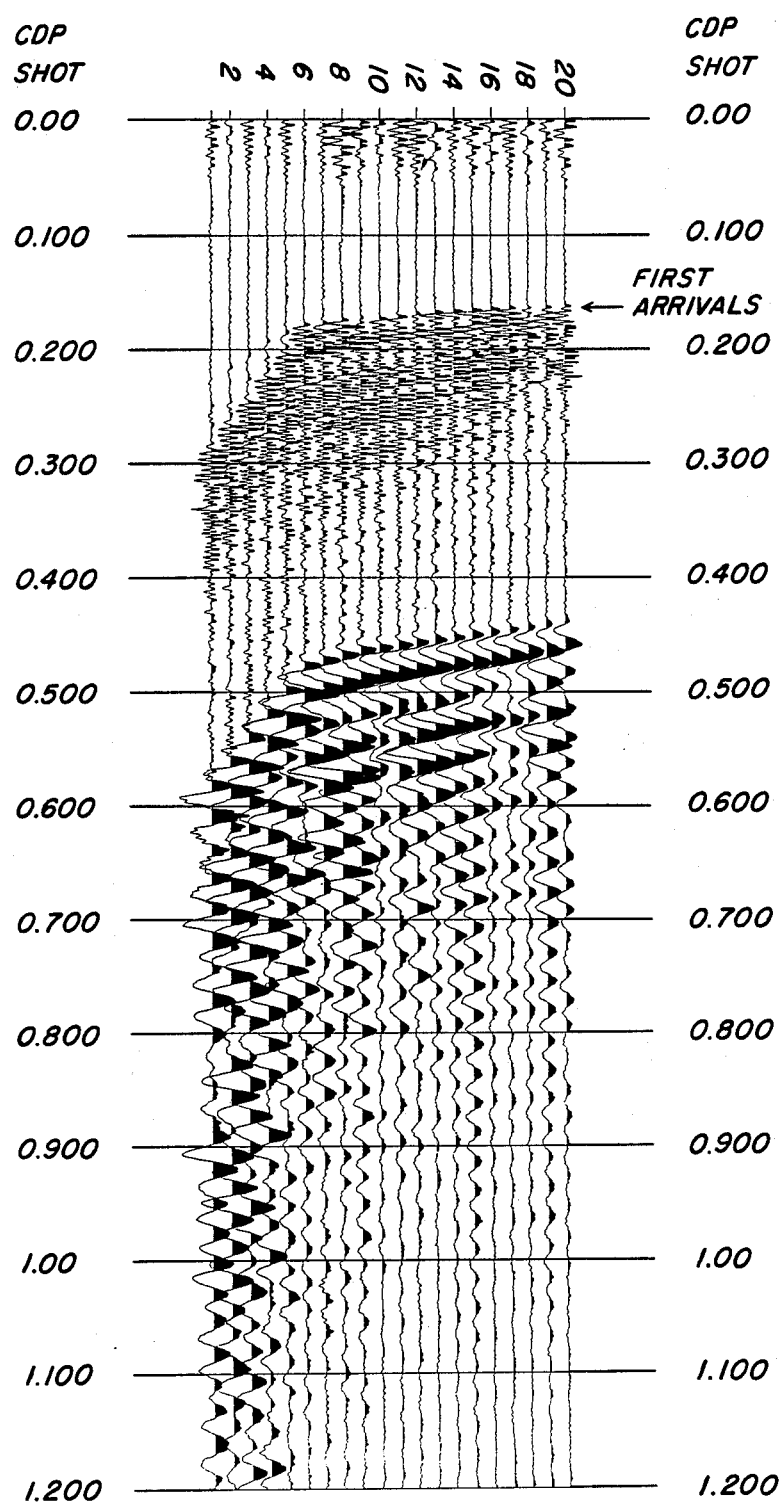
FIG. 5 illustrates the x-t domain seismic record illustrated in FIG. 2 after the removal of sinusoidal noise therefrom in accordance with the methods set forth in FIG. 1.

Proceeding to step 120, a dB scale frequency domain amplitude spectrum is produced from the FFT of the selected seismic trace utilizing methods well known in the art. For example, FIG. 3 illustrates a dB scale frequency domain amplitude spectrum constructed from the FFT of a selected seismic trace of the seismic section illustrated in FIG. 2.

Proceeding to step 125, the line frequency or frequencies corresponding to the frequency of the contaminating sinusoidal noise to be removed is determined by analyzing the produced frequency domain amplitude spectrum. For a seismic trace comprised of seismic data and at least one sinusoidal noise signal, the transformation of the seismic trace from the time domain into the frequency domain will produce one or more amplitude spikes which correspond to the frequency or frequencies of the sinusoidal noise component of the trace. For example, FIG. 3 clearly indicates that the seismic data is contaminated by strong line interference at 60 Hz, 180 Hz, 300 Hz, 420 Hz and 540 Hz.

Proceeding to step 130, the frequency domain amplitude spectrum is analyzed to yield information necessary to construct a filter for removing the sinusoidal noise from the collected seismic data. At step 135, the desired notch width in Hz is determined from the dB scale frequency domain amplitude spectrum. Preferably, the notch width should be measured as the distance between points on either side of each line frequency where a 3 dB drop in response occurs for a white (broadband) random signal. At step 140, the desired notch depth, i.e. the amount of rejection in dB at each identified line frequency, is determined from the dB scale frequency domain amplitude spectrum.

Proceeding to step 145, a filter order N, i.e. the number of filter weights, is selected for the notch filter to be constructed and, at step 150, a white noise parameter is selected. Having determined the sampling interval, notch width and notch depth, the filter order and white noise parameter may be determined by utilizing the nomogram illustrated in FIG. 6. The construction of a nomogram suitable for use in conjunction with the teachings of the present invention is more fully set forth later.

In its most general sense, the nomogram transforms the sampling interval, notch width and notch depth into the parameters necessary for constructing the desired filter. For example, if it is assumed that the desired notch width is 4 Hz, that −70 dB of rejection is needed and that the seismic data are sampled at 2 ms, then proper utilization of the nomogram illustrated in FIG. 6 would indicate that the desired filter parameters for removing sinusoidal noise from the collected seismic data would be a filter order of 64 and a white noise parameter $\sigma^2$ of 1%. To determine the desired parameters for the provided example, one would first turn to the top part of the nomogram, proceed across from the 4 Hz notch width to intersect the sloping line labeled 2 ms and read from the top of the nomogram to determine the required filter order—in this case 64 points. Then, turning to the bottom part of the nomogram, the intersection of −70 dB (rejection) and 64 filter points would lay on the line labeled 1% white noise. This means that a 64 point operator designed with 1% white noise parameter will have the desired response necessary to $$\begin{bmatrix} R_s(0) + \sigma^2 & R_s(1) & R_s(2) & \ldots & R_s(N-1) \\ R_s(-1) & R(0) + \sigma^2 & R_s(1) & \ldots & \\ \cdot & & & & \\ \cdot & & & & \\ R_s(-N+1) & R_s(-N+2) & R_s(-N+3) & \ldots & R_s(0) + \sigma^2 \end{bmatrix}$$

produce a 4 Hz wide, −70 dB deep notch filter.

Proceeding to step 155, the exact autocorrelation function of the contaminating sinusoid is determined for lags 0, 1, . . . , N-1 where N=the determined filter order. More specifically, the exact autocorrelation function is determined according to the following:

$R_s(k) = \cos 2\pi f\tau$      (5)
$k = 0, 1, \ldots N-1$;
$\tau = k\Delta t$, where $\Delta t$ is the sampling interval
$f$ = frequency of the contaminating sinusoid Having determined at step 155 a series of values for the exact autocorrelation function, an autocorrelation matrix is constructed at step 160 according to the following:

$$\begin{bmatrix} R_s(0) & R_s(1) & R_s(2) & \ldots & R_s(N-1) \\ R_s(-1) & R(0) & R_s(1) & \ldots & \\ \cdot & & & & \\ \cdot & & & & \\ R_s(-N+1) & R_s(-N+2) & R_s(-N+3) & \ldots & R_s(0) \end{bmatrix} \quad (6)$$

The autocorrelation matrix may be modified at step 165 utilizing the previously determined white noise parameter to produce the following:

$$\begin{bmatrix} R_s(0) + \sigma^2 & R_s(1) & R_s(2) & \ldots & R_s(N-1) \\ R_s(-1) & R(0) + \sigma^2 & R_s(1) & \ldots & \\ \cdot & & & & \\ \cdot & & & & \\ R_s(-N+1) & R_s(-N+2) & R_s(-N+3) & \ldots & R_s(0) + \sigma^2 \end{bmatrix} \quad (7)$$

Proceeding to step 170, as there is a linear system of equations for $h_k$, k=0, 1, . . . , N-1, the produced whitened autocorrelation matrix may be solved according to Equation (8) set forth below to yield a convolutional filter $h_k$ capable of removing sinusoidal noise of the designated frequencies while leaving other frequencies minimally attenuated.

$$\begin{bmatrix} h_0 \\ h_1 \\ \cdot \\ \cdot \\ h_{N-1} \end{bmatrix} = \begin{bmatrix} 1 \\ 0 \\ \cdot \\ \cdot \\ 0 \end{bmatrix} \quad (8)$$

Proceeding to step 175, the produced convolutional filter $h_k$ is utilized by application of the convolution technique to determine the filter output $y_t$ which closely approximates the desired sinusoidal noise removed seismic data $d_t$. Recalling that it is desired to apply the determined convolutional filter $h_k$ to the seismic trace $x_t$ to obtain the filter output $y_t$, the filter output $y_t$ may be represented according to the following:

$$y_t = \sum_{k=0}^{N-1} h_k x_{t-k} \quad (9)$$

In such a manner, the sinusoidal noise removed seismic data $d_t$ is produced. The seismic data may now be processed further, plotted, displayed or analyzed according to any one of numerous techniques to yield useful information regarding the geophysical characteristics of the explored formation.

In a second embodiment of the invention, the methods described above are modified so that the constructed filter is capable of removing sinusoidal noise at a plurality of frequencies. For example, the seismic trace amplitude spectrum illustrated in FIG. 3 includes sinusoidal noise at a fundamental frequency of 60 Hz and harmonics at 180 Hz, 300 Hz, 420 Hz and 540 Hz. Such a goal is accomplished by the procedure set forth below:

After the line frequencies have been identified, each line frequency is subject to the methods of analysis set forth above to determine the notch width and notch depth for each line frequency. Each notch width and notch depth corresponding to a line frequency are examined and compared. Then one selected pair is utilized in conjunction with the nomogram illustrated in FIG. 6 to determine a filter order N and white noise parameter $\sigma^2$. The exact autocorrelation function is determined and the determined autocorrelation values used to produce an autocorrelation matrices for each line frequency. The autocorrelation matrix for each line frequency are then summed together. The determined white noise parameter is scaled by a factor of 1/L where L is the total number of line frequencies to be rejected by the single filter. The summed autocorrelation matrix is then whitened by the scaled white noise parameter. After whitening, $h_t$ and $y_t$ may now be determined in accordance with the methods set forth above.

The methods set forth above will produce a minimum phase filter for application to the seismic trace comprised of a data component and a sinusoidal noise component. In yet another embodiment of the invention, it is contemplated that a zero phase, i.e. symmetric, filter may be constructed for use instead. The zero phase filter may be constructed by concatenating the minimum phase filter and its reverse to form a symmetric filter of order 2N-1.

Figure 6:
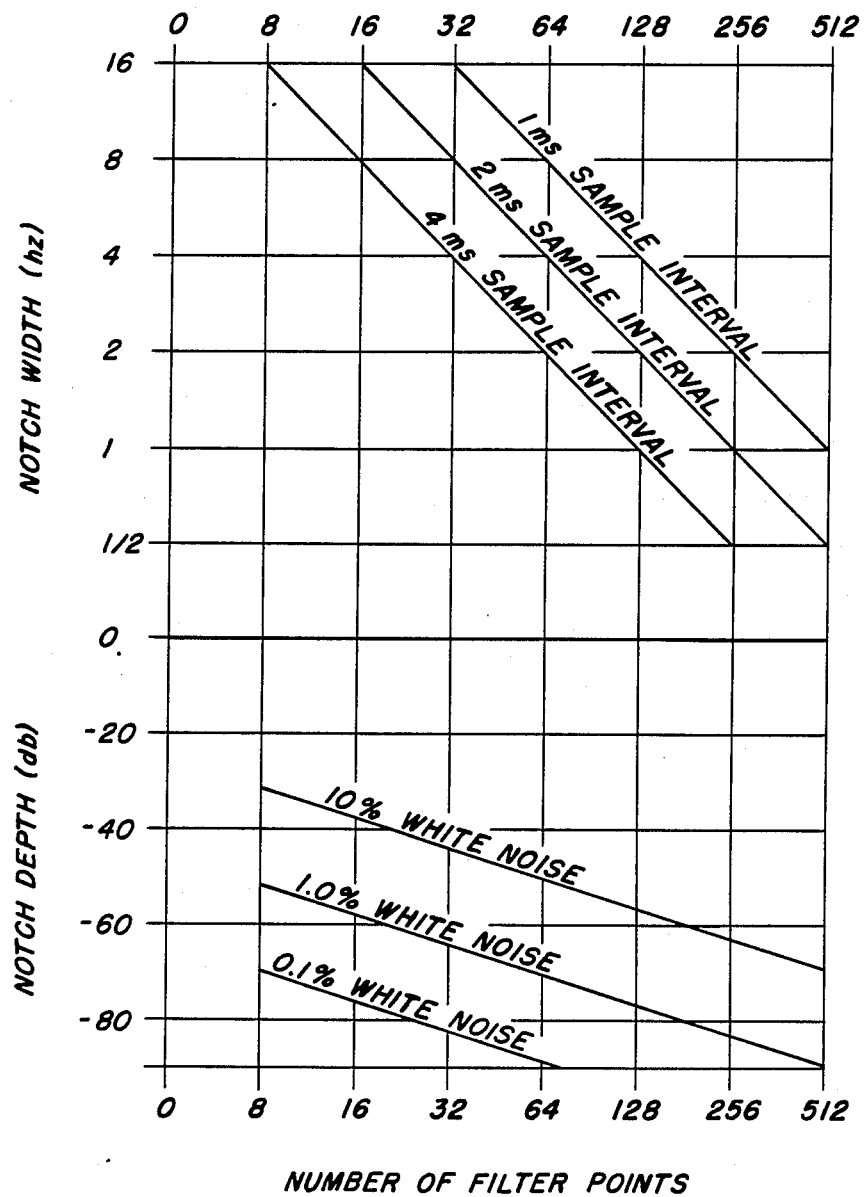
FIG. 6 illustrates a nomogram to be used in conjunction with the method of removing sinusoidal noise from seismic data set forth in FIG. 1.
Figure 7A:
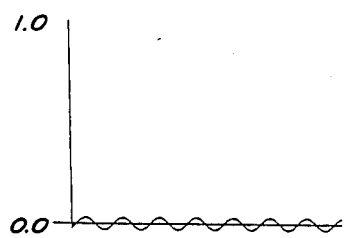
FIGS. 7a-c illustrate the characteristics of a filter response to be utilized in constructing the nomogram illustrated in FIG. 6.
Figure 7B:
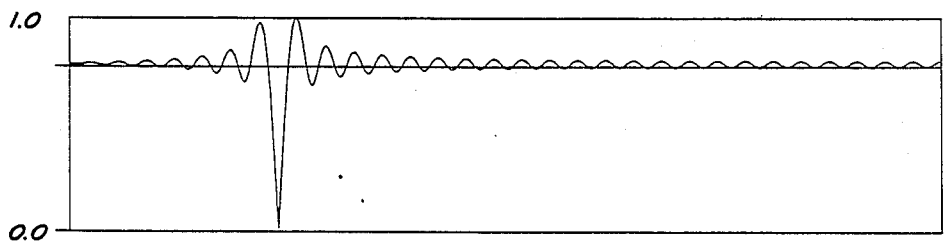
Figure 7C:
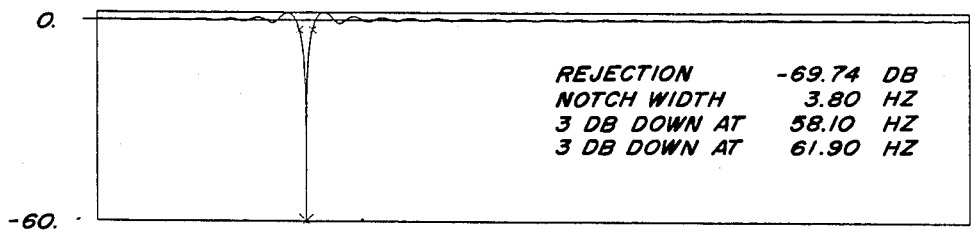

Turning now to FIGS. 7a-c, the method of constructing a nomogram such as the one illustrated in FIG. 6 is now set forth in greater detail. A set of filter parameters such as filter points, sample interval, line frequency and white noise factor are selected and the filter corresponding to the selected parameters is constructed. For example, FIG. 7a illustrates a filter which may be constructed utilizing the specified parameters. The linear scale and dB scale frequency domain amplitude spectrums are then constructed by applying the FFT to the filter. From an analysis of the linear scale and dB scale frequency domain spectrums, which are respectively illustrated in FIGS. 7b and 7c, the notch width and rejection may be determined and the relationship between notch width and filter order and the relationship between notch depth and white noise may be plotted. Repeated determination and plotting of filter responses calculated from selected filter operators may be utilized to produce the nomogram illustrated in FIG. 6.

Thus, there has been described and illustrated herein a method for processing geophysical data to remove sinusoidal noise from the acquired data. However, those skilled in the art will recognize that many modifications and variations besides those specifically mentioned may be made in the techniques described herein without departing substantially from the concept of the present invention. Accordingly, it should be clearly understood that the form of the invention described herein is exemplary only, and is not intended as a limitation on the scope of the present invention.

What is claimed is:

1. A method for removing sinusoidal noise from a data trace comprising the steps of:
   determining a line frequency for said sinusoidal noise;
   determining an exact autocorrelation function for said sinusoidal noise of said determined frequency;
   producing a convolutional filter from said exact autocorrelation function; and
   applying said filter to said data trace to remove said sinusoidal noise; and
   wherein the step of determining an exact autocorrelation function for said sinusoidal noise of said determined frequency further comprises the steps of:
   producing a frequency domain amplitude spectrum for said data trace;
   determining a notch width from said amplitude spectrum;
   determining a filter order comprised of a plurality of filter weights from said notch width; and
   determining the exact autocorrelation function for said sinusoidal noise of said determined frequency from said filter order.

2. The method according to claim 1 wherein said notch width is determined by a pair of 3 dB down locations, one on each side of said line frequency.

3. The method according to claim 1 further comprising the steps of:
   determining a notch depth from said amplitude spectrum;
   determining a white noise parameter from said filter order and said notch depth; and
   modifying said produced convolutional filter by applying said white noise parameter prior to applying said convolutional filter to said data trace.

4. The method according to claim 1 further comprising the step of producing a nomogram numerically relating said notch width and said filter order.

5. The method according to claim 4 wherein the step of producing a nomogram numerically relating said notch width and said filter order further comprises the steps of:
   selecting a sample interval for said data trace;
   selecting a plurality of filter orders for said sample interval;
   producing a filter amplitude spectrum for each of said plural filter orders;
   determining a filter notch width for each of said plural filter amplitude spectrums; and
   plotting said filter notch widths versus said filter orders to produce said nomogram.

6. The method according to claim 3 further comprising the step of producing a nomogram numerically relating said notch depth and said filter order.

7. The method according to claim 6 wherein the step of producing a nomogram numerically relating said notch depth and said filter order further comprises the steps of:
   selecting a white noise parameter for said data trace;
   selecting a plurality of filter orders for said white noise parameter;
   determining a filter notch depth for each of said plural filter amplitude spectrums; and
   plotting said filter notch depths versus said filter orders to produce said nomogram.

8. The method of claim 1 wherein the step of determining said line frequency for said sinusoidal noise further comprises the steps of:
   transforming said data trace into the frequency domain to produce an amplitude spectrum for said data trace; and
   determining said line frequency from said frequency domain amplitude spectrum.

9. The method according to claim 1 wherein the step of applying said filter to said data trace to remove said sinusoidal noise further comprises the step of convolving said data trace with said filter to produce said sinusoidal noise removed data trace.

10. In seismic exploration wherein seismic sources are activated at spaced locations along a line of exploration and the amplitude of reflections are recorded as a function of time along said line to produce a series of seismic traces, said seismic traces comprised of a seismic data component and a plurality of sinusoidal noise components, a method of processing said seismic traces to remove said plural sinusoidal noise components comprising the steps of:

determining a frequency for each of said sinusoidal noise components;

determining an autocorrelation function for each of said sinusoidal noise frequencies;

summing said determined autocorrelation functions;

producing a convolutional filter from said summed autocorrelation functions; and applying said filter to said data trace to remove said plurality of sinusoidal noise components; and wherein the step of determining a summed autocorrelation function for said plural sinusoidal noise components of said determined frequencies further comprises the steps of:

producing a frequency domain amplitude spectrum for said data trace;

determining a notch width from said amplitude spectrum for each of said frequencies corresponding to said plurality of sinusoidal noise components;

determining a filter order comprised of a plurality of filter weights for one of said notch widths; and determining the exact autocorrelation function for each of said sinusoidal noise components of said determined frequencies for said filter order.

11. The method according to claim 10 wherein each said notch width is determined by a pair of 3 dB down locations, one on each side of each said line frequency.

12. The method according to claim 10 further comprising the steps of:

determining a notch depth from said amplitude spectrum for each said line frequency;

determining a white noise parameter from said filter order and said notch depth for one of said line frequencies;

summing the total number of line frequencies at which sinusoidal noise is to be removed;

scaling said white noise parameter by said line frequency sum; and modifying said convolutional filter produced by summing said autocorrelation functions by applying said scaled white noise parameter prior to producing said convolutional filter for application to said data trace.

13. The method according to claim 10 further comprising the step of producing a nomogram numerically relating said notch width and said filter order.

14. The method according to claim 13 wherein the step of producing a nomogram numerically relating said notch width and said filter order further comprises the steps of:

selecting a sample interval for said data trace;

selecting a plurality of filter orders for said sample interval;

producing a filter amplitude spectrum for each of said plural filter orders;

determining a filter notch width for each of said plural filter amplitude spectrums; and plotting said filter notch widths versus said filter orders to produce said nomogram.

15. The method according to claim 12 further comprising the step of producing a nomogram numerically relating said notch depth and said filter order.

16. The method according to claim 15 wherein the step of producing a nomogram numerically relating said notch depth and said filter order further comprises the steps of:

selecting a white noise parameter for said data trace;

selecting a plurality of filter orders for said white noise parameter;

determining a filter notch depth for each of said plural filter amplitude spectrums; and plotting said filter notch depths versus said filter orders to produce said nomogram.

17. A seismic exploration system comprising:

means for generating seismic energy into the earth's subsurface;

means for recording reflections of said seismic energy from subsurface reflecting interfaces, said reflected seismic energy recorded as seismic traces; and means for removing sinusoidal noise from at least one frequency from said recorded seismic traces, said noise removal means including:

means for determining said at least one frequency of said sinusoidal noise;

means for determining an exact autocorrelation function for said sinusoidal noise of at least one frequency;

means for producing a filter from said autocorrelation function; and means for convolving said filter and said seismic trace; and means for producing a frequency domain amplitude spectrum for said seismic trace;

means for determining a notch width for each of said at least one frequencies;

means for determining a filter order comprised of a plurality of filter weights from said notch width; and means for determining said autocorrelation function for said sinusoidal noise of said at least one frequency for said filter order.

18. Apparatus according to claim 17 further comprising means for summing said autocorrelation functions determined for each of said at least one frequencies.

19. Apparatus according to claim 17 further comprising:

means for determining a notch depth for each of said at least one frequencies;

means for determining a white noise parameter from said filter order and one of said notch depths;

means for summing the total number of line frequencies at which sinusoidal noise is to be removed; and means for scaling said white noise parameter by said line frequency sum; and means for applying said white noise parameter to said autocorrelation function.

20. Apparatus for removing sinusoidal noise from a seismic trace comprising:

means for determining said at least one frequency of said sinusoidal noise;

means for determining an autocorrelation function for said sinusoidal noise of at least one frequency;

means for producing a filter from said autocorrelation function; and means for convolving said filter and said seismic trace; and means for producing a frequency domain amplitude spectrum for said seismic trace;

means for determining a notch width for each of said at least one frequencies;

means for determining a filter order comprised of a plurality of filter weights from said notch width; and means for determining said autocorrelation function for said sinusoidal noise of said at least one frequency for said filter order.

21. Apparatus according to claim 20 further comprising means for summing said autocorrelation functions determined for each of said at least one frequencies.

22. Apparatus according to claim 20 further comprising:

means for determining a notch depth for each of said at least one frequencies;

means for determining a white noise parameter from said filter order and one of said notch depths;

means for summing the total number of line frequencies at which sinusoidal noise is to be removed; and means for scaling said white noise parameter by said line frequency sum; and means for applying said white noise parameter to said autocorrelation function.

* * * * *